Nov. 13, 1928.
S. C. HATFIELD
1,691,190
FLEXIBLE GEAR
Filed March 9, 1927
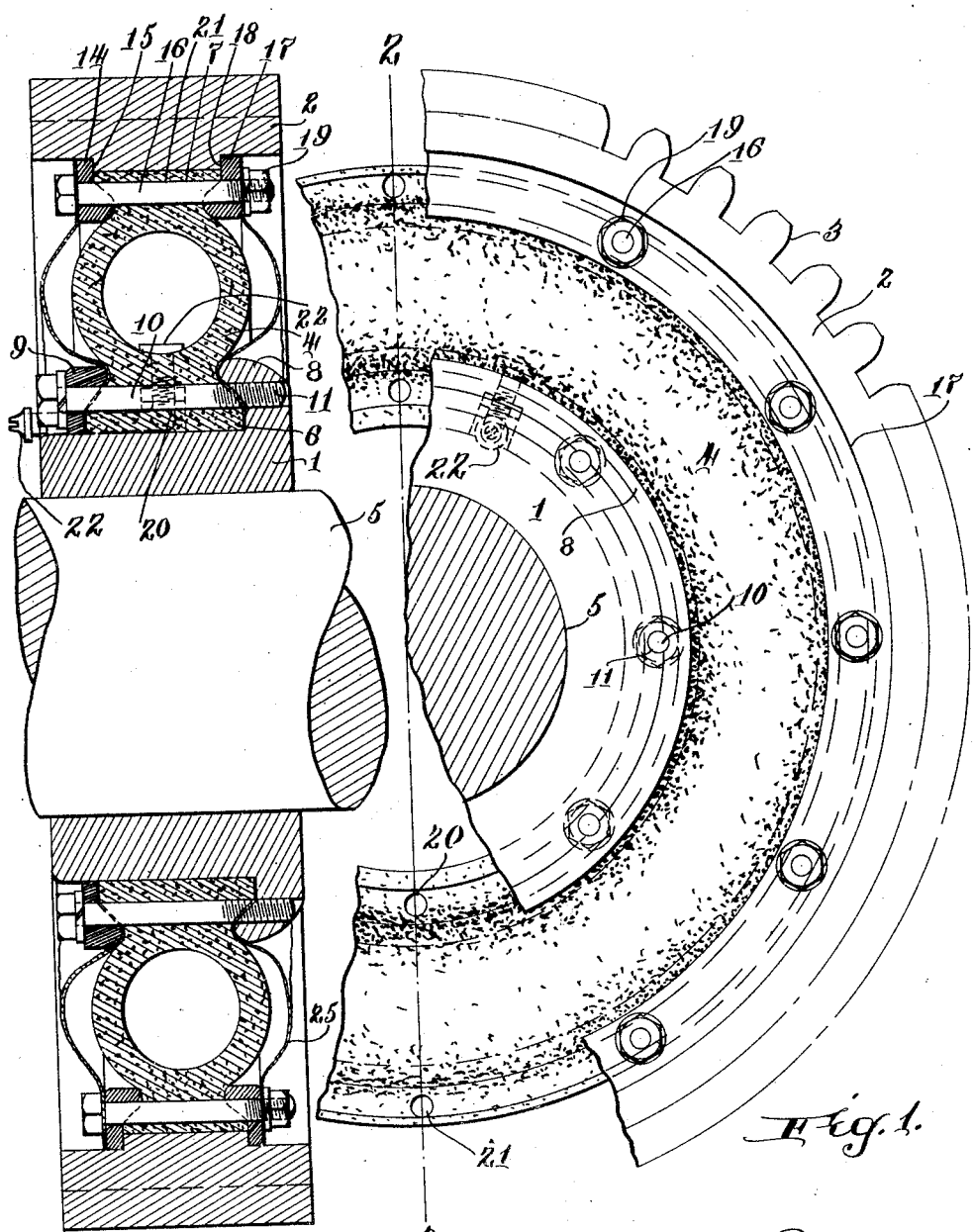

Patented Nov. 13, 1928.

1,691,190

UNITED STATES PATENT OFFICE.

SCHUYLER C. HATFIELD, OF BALTIMORE, MARYLAND.

FLEXIBLE GEAR.

Application filed March 9, 1927. Serial No. 173,929.

In the various driving connections involving toothed gearing difficulties are encountered as stripping of the teeth on account of the sudden change of torque, binding and grinding due to slight inaccuracy of alignment, binding and grinding due to too close meshing of the gears and play due to wearing of the teeth. These difficulties are wholly or partially overcome by the provision of the flexible gear which is the subject of the invention. While it is described in connection with a toothed gearing, it may be utilized with various types of gearing within the scope of the invention.

The gear embodying the invention in the preferred form comprises an inner hub member and an outer rim member which carries the teeth or other engaging means with a flexible annular pad between the members and secured to both of them.

This pad may, if desired, be hollow and inflated and it is preferably constructed with inner and outer beads and the hub and rim members are provided with bead clamping, or other inner and outer peripheral securing means for the pad.

In the accompanying drawings I have illustrated a flexible gear embodying the features of my invention in the preferred form.

In the drawings:

Figure 1 is a side elevation partly broken away for convenience of illustration.

Figure 2 is a section on the line 2—2 of Figure 1.

Referring to the drawings by numerals, each of which is used to indicate the same or similar parts in the different figures, the flexible gear, as shown, comprises an inner or hub section 1, an outer or ring section 2 provided with peripheral driving means shown in the form of teeth 3.

The ring member 2 is spaced outward radially from the hub member 1, i. e., of an inside diameter considerably greater than the outside diameter of the hub and there is an annular pad 4 between the hub and rim sections secured to both said sections. The hub member 1 is mounted on a shaft 5 to rotate therewith.

In the form of the invention shown, the annular pad 4 is provided with inner and outer beads 6 and 7 and the hub and rim are provided on their outer and inner peripheries, respectively, with bead clamping means.

To this end the hub has an outwardly projecting bead engaging flange 8 the same being preferably inclined to conform to the corresponding inclination of the bead, the same being of a reducing taper toward the center of the hub. The inner bead 6 is engaged on one side by the flange 8 and on the other side by a correspondingly formed bead clamping ring 9 the ring being drawn up against the bead and clamped to the hub by means of bolts 10 spaced along the periphery of the hub, passed through the ring 9 and threaded into the flange 8 in suitable apertures 11 therein. The outer bead 7 which fits inside the ring member 2 is clamped to said ring member by means of a clamping ring 14 which engages an annular shoulder 15 within the ring in the plane of the corresponding surface of the bead the ring being secured by means of bolts 16 which, like the bolts 10, are parallel to the axis.

These bolts, as shown, are passed through a second clamping ring 17 seated on an opposite shoulder 18 corresponding to the shoulder 15 and spaced therefrom preferably by a little less than the width of the bead. The clamping rings 14 and 17 are drawn tightly against the shoulders 15 and 18 and against the bead 7 by tightening the nuts 19 on the bolts 16, the latter being spaced along the bead.

It is, of course, not essential that both the rings 17 be made removable and they may be provided with any preferred additional means for preventing slippage of the rim in the direction of the circumference. The bolts 10 and 16 are passed through suitable apertures 20 and 21 in the beads.

The pads 4 may be of rubber, rubber and fabric, or other suitable flexible material, as rawhide or artificial fibrous material and they may be hollow and, if desired, inflated to vary the flexibility, an air valve 22 for this purpose being shown.

The structure shown is also provided with annular strips of sheet material 25 enclosed within the bead clamps in any suitable manner to protect the pads from oil and grease or other circumstances which might cause deterioration.

It will be understood that the flexible feature provides for slight yielding of the gear in the direction of rotation, i. e., in a peripheral direction, which greatly reduces the shock due to variation of torque in starting, stopping and the like, such yield being capable of variation by differences of flexibility and differences of inflation. The pad also provides a slight degree of yield laterally, taking up variation of alignment and preventing undue friction. The flexibility also provides for a yielding in the direction of the radius, which may be used to take up play due to wear and for other purposes, as preventing undue radial pressure and grinding.

I have thus described specifically and in detail a single embodiment of my invention in the preferred form in order that the nature and operation of the same may be clearly understood, however, the specific terms herein are used descriptively rather than in a limiting sense, the scope of the invention being defined in the claims.

What I claim as new and desire to secure by Letters Patent is:

1. A machine gear having an outer ring adapted to engage a cooperating gear, a hub member surrounded by the ring member and spaced therefrom radially, a hollow pad between the hub and ring member, the pad having inner and outer beads, the ring member having bead clamping means on its inner periphery and the hub member having bead clamping means on its outer periphery.

2. A machine gear having an outer ring adapted to engage a cooperating gear, a hub member surrounded by the ring member and spaced therefrom radially, a hollow pad between the hub and ring member, the pad having inner and outer beads, the ring member having bead clamping means on its inner periphery and the hub member having bead clamping means on its outer periphery, and means providing for inflation of the pad.

3. A machine gear comprising an outer toothed ring, a hub member surrounded by and spaced inwardly from the ring, a flexible pad between the hub and ring and means securing the pad to both the hub and ring, the securing means being in the form of an inner and outer bead on the pad and inner and outer bead clamping means on the ring and hub respectively, the clamping means comprising a rib encircling the hub on one side of the bead, a removable ring on the other side of the bead, bolts for drawing the ring toward the rib clamping the bead to the hub, the clamping means on the toothed ring comprising two rings and connecting bolts and an inner projecting rib on the toothed ring with which rib the bead registers, the rib serving as a support for the rings between which it is engaged and clamped to the bead.

Signed by me at Baltimore, Maryland, this 7th day of March, 1927.

SCHUYLER C. HATFIELD.